United States Patent [19]

Ogiso et al.

[11] Patent Number: 4,857,961
[45] Date of Patent: Aug. 15, 1989

[54] IMAGE FORMING APPARATUS

[75] Inventors: Takasi Ogiso, Shizuoka; Yoshiyuki Monma; Toshiaki Aono, both of Kanagawa, all of Japan

[73] Assignee: Fuji Photo Film Co., Ltd., Kanagawa, Japan

[21] Appl. No.: 200,882

[22] Filed: Jun. 1, 1988

[30] Foreign Application Priority Data

Jun. 3, 1987 [JP] Japan .................................. 62-139601
Jun. 3, 1987 [JP] Japan .................................. 62-139602

[51] Int. Cl.$^4$ ............................................. G03B 27/52
[52] U.S. Cl. .......................................... 355/27; 355/28
[58] Field of Search ............................ 355/27, 28, 77; 250/317.1–319; 219/216

[56] References Cited

FOREIGN PATENT DOCUMENTS 62-279973 12/1987 Japan ...................................... 355/28

Primary Examiner—L. T. Hix
Assistant Examiner—D. Rutledge
Attorney, Agent, or Firm—Sughrue, Mion, Zinn, Macpeak & Seas

[57] ABSTRACT

An image forming apparatus for fixing an image on a dye-fixing element in accordance with image information in a photosensitive element is provided which comprises a storage for storing a dye-fixing element, another storage for storing a support, and means for bonding the dye-fixing element to the support. The apparatus operates to take the dye-fixing element and the support out of their storages and to feed them to the bond means where the dye-fixing element is bonded to the support. The dye-fixing element usually has an adhesive layer of a self-adhesive or hot-melt adhesive composition.

10 Claims, 6 Drawing Sheets

IMAGE FORMING APPARATUS

BACKGROUND OF THE INVENTION

1. Field of the Invention

This invention relates to an apparatus for forming an image through heat development.

2. Discussion of Prior Art

An apparatus for forming a color image using a heat-developable photosensitive element is disclosed in Japanese Patent Application Kokai No. 59-75247, for example, as comprising an exposure section for exposing a heat-developable photosensitive element, a heat-developing section for heat developing the exposed element to form an image, and a transferring section for placing the heat-developed element in close contact with a dye-fixing or image-receiving element to transfer the image to the dye-fixing element.

The above-mentioned image forming process comprising forming an image on a photosensitive element and transferring the image to a dye-fixing element has to use a certain type of material to form a support for the dye-fixing element in order to obtain an image of quality. Support materials meeting the requirement are generally expensive.

If commonly available material such as ordinary paper can be used as the support, a substantial cost saving is achieved because the burden of selecting support material is mitigated. Since paper is available in various qualities, elimination of paper quality restriction increases the degree of freedom in image formation. For example, an image can be obtained in quality of paper, which will promise an aesthetic or artistic additive value.

SUMMARY OF THE INVENTION

An object of the present invention is to provide an image forming apparatus which can economically use a support of commonly available material such as ordinary paper to form an image.

According to the present invention, there is provided an apparatus for fixing an image on a dye-fixing element in accordance with image information in a photosensitive element, comprising first storage means for storing a dye-fixing element, second storage means for storing a support, bond means for bonding a dye-fixing element to a support, and feed means for taking the dye-fixing element and the support out of the first and second storage means, respectively, and feeding them to the bond means where the dye-fixing element is bonded to the support.

Preferably, the dye-fixing element has an adhesive layer so that the dye-fixing element is bonded to the support through the adhesive layer. The adhesive layer may be either a self-adhesive layer or a hot-melt layer. In the case of a hot-melt adhesive layer, the bond means should be capable of heat bonding the dye-fixing element to the support through the hot-melt layer.

The apparatus may further include third storage means for storing the photosensitive element and contact means for placing the photosensitive element in close contact with the dye-fixing element bonded to the support.

The term "image information" used herein encompasses a latent image in silver halide and an imagewise distribution of degree of polymerization resulting from imagewise exposure of photo-polymerizable polymer.

In the most preferred embodiment of the present invention, the apparatus is designed such that a photosensitive element having at least a photosensitive silver halide, a binder and a dye-providing substance on a support is exposed imagewise, and an image is formed on a dye-fixing element by heating during or after the imagewise exposure.

BRIEF DESCRIPTION OF THE DRAWINGS

The above and other objects, features, and advantages of the present invention will be better understood from the following description taken in conjunction with the accompanying drawings, in which.

DETAILED DESCRIPTION OF THE INVENTION

The image forming apparatus of the present invention essentially includes first storage means for storing a dye-fixing element, second storage means for storing a support, and bond means for bonding a dye-fixing element to a support. The apparatus further includes feed means for taking the dye-fixing element out of the first storage means, taking the support out of the second storage means, and feeding the dye-fixing element and the support to the bond means where the dye-fixing element is bonded to the support.

Most often, the dye-fixing element has an adhesive layer and the dye-fixing element is bonded to the support through the adhesive layer. The adhesive layer may be either a self-adhesive layer or a hot-melt layer.

Figure 1:
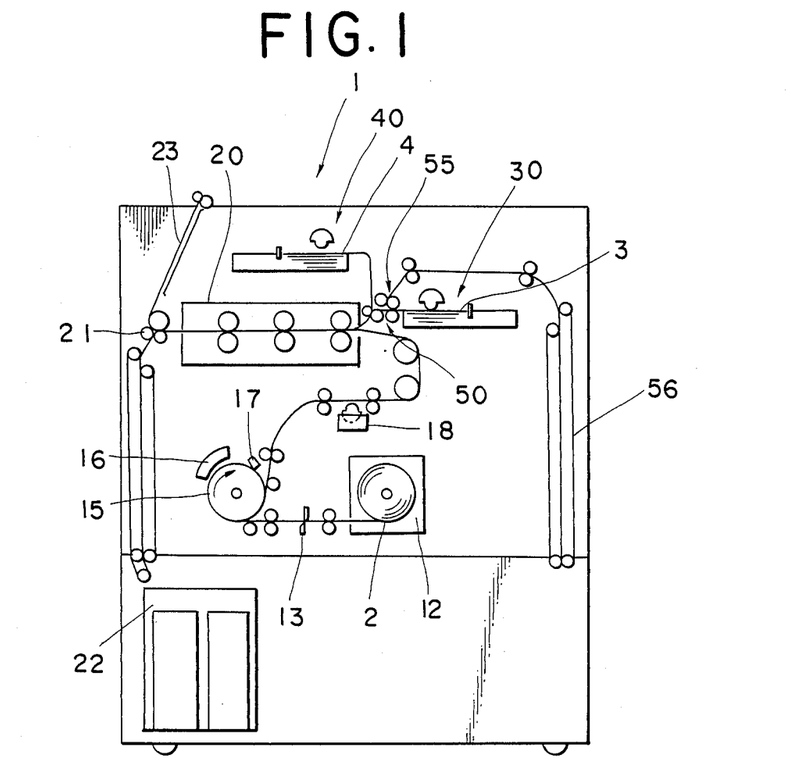
FIG. 1 is a schematic elevation of an image forming apparatus according to one embodiment of the present invention.

Referring to FIG. 1, there is illustrated an image forming apparatus according to one preferred embodiment of the present invention. Since a cut sheet or a continuous web is fed from one station to another station in the apparatus, the terms upstream and downstream with respect to the advance of the sheet or web are used to locate the stations. The image forming apparatus generally designated at 1 includes a housing in which a magazine 12 is mounted for receiving therein a roll of heat-developable photosensitive element 2. The magazine 12 is followed by a first series of guide rollers and a cutter 13. At the end of the first series of guide rollers is disposed an exposure drum 15 which rotates clockwise in a direction of arrow A in FIG. 1. An exposure head 16 is disposed to face a portion of the outer periphery of the drum 15. A scraper 17 is disposed in contact with the drum 15 downstream of the exposure head 16 with respect to the direction of arrow A. The exposure drum 15 is followed by a second series of guide rollers. A water applicator 18 is located in the midway of the second series of guide rollers if necessary.

At the end of the second series of guide rollers is disposed a heat-developing/transferring section 20 having an enclosure and a series of heat rollers in the illustrated embodiment.

Upstream of the heat-developing/transferring section 20 are disposed first and second storage means, namely, a dye-fixing element storing section 30 for storing a dye-fixing element 3 having an adhesive layer and a support storing section 40 for storing a support 4. In the embodiment illustrated in FIG. 1, each section is in the form of a tray for storing a stack of sheets and a dispenser associated therewith for delivering sheets one by one. Each storage section is followed by a series of rollers. Paths extending from the storage sections 30 and 40 are joined at a bonding section 50 which is illustrated as comprising a pair of contact rolls in FIG. 1. Between the storage and bonding sections 30 and 50 is disposed a peeler section 55 which is branched to a series of guide rollers and a disposal conveyor 56.

Downstream of the heat-developing/transferring section 20 is disposed a separator section 21. The separator 21 is followed by an upward extending conveyor 22 and a downward extending conveyor 23. A dryer is provided near the upward conveyor 22 which leads to a collection tray (not shown) at the top of the housing. The downward conveyor 23 leads to a disposal tray 24 at the bottom of the housing.

The apparatus operates as follows. The photosensitive element 2 is taken out of the magazine 12 from the outermost turn of its roll, cut to a predetermined length by the cutter 13, and wound around the exposure drum 15 which rotates clockwise in a direction of arrow A in FIG. 1. Moving with the drum 15, the photosensitive element 2 is exposed to light from the exposure head 16. After exposure, the drum 15 is reversely rotated so that the scraper 17 acts to separate the exposed element away from the drum 15. The exposed element is then fed to the heat-developing/transferring section 20 through the second series of rollers.

If desired, the water applicator 18 can apply water to the exposed element while it is fed from the exposure drum 15 to the heat-developing/transferring section 20.

The dye-fixing element storing section 30 stores dye-fixing elements 3 each having a self-adhesive layer and the support storing section 40 stores supports 4. Dispensers associated with the sections 30 and 40 synchronously deliver a dye-fixing element and a support to the bonding section 50 where the dye-fixing element is bonded to the support through the adhesive layer. The support having the dye-fixing element bonded thereto is usually fed to the heat-developing/transferring section 20 where it is synchronously mated with the exposed photosensitive element so that the dye-fixing element is in close contact with the exposed photosensitive element. The assembly is heated by a suitable heater in the section 20. As the assembly advances through the section 20, the photosensitive element 2 is developed and the developed image is transferred to the dye-fixing element.

At the end of the heat-developing/transferring section 20, the assembly arrives at the separator section 21 where the photosensitive element is separated from the support having the dye-fixing element bonded threto. The photosensitive element is delivered downward by the conveyor 23 into the disposal tray 24 while the support having the dye-fixing element bonded thereto is delivered upward to the collection tray by the conveyor 22 through a dryer.

In the above-illustrated embodiment, the dye-fixing element 3 and the support 4 are originally stored in the form of discrete sheets. Either the dye-fixing element or the support may be a length of web wound up in a roll form. A cutter may be disposed in front of the storage section to cut the web to a predetermined length.

Since the dye-fixing element 3 usually has a dye-fixing layer on one side and a self-adhesive layer on the rear side, a tentative support in the form of a release paper usually overlies the self-adhesive layer to protect the self-adhesive layer from adhering to any adherend. In the embodiment illustrated in FIG. 1, the peeler 55 is disposed in front of the storage section 30 for peeling the tentative support from the dye-fixing element 3. The tentative support must be removed from the dye-fixing element 3 to expose the self-adhesive layer before the dye-fixing element 3 can be bonded to the support 4 through the adhesive layer at the bonding section 50. After being peeled away from the dye-fixing element 3, the tentative support is carried away through the disposal conveyor 56.

The bonding section 50 and the peeler 55 are separately provided in the embodiment illustrated in FIG. 1 although they may be combined so as to conduct peeling and bonding at the same time or in immediate sequence.

The support 4 is bonded to the dye-fixing element 3 at the bonding section 50 and then placed in contact with the photosensitive element 2 in the heat-developing/transferring section 20 in the embodiment illustrated in FIG. 1 although these components may be arranged such that bonding and mating are carried out at the same time. Namely, bonding, heat developing, and transferring steps may be carried out by a single mechanism.

In the embodiment illustrated in FIG. 1, the heat developing section for heat developing the exposed photosensitive element and the transferring section for placing the heat developed element in contact with the dye-fixing element bonded to the support and heating the assembly to transfer the image to the dye-fixing element are provided in the same zone. That is, the heat-developing/transferring section 20 is provided in which the exposed photosensitive element is placed in contact with the support having the dye-fixing element bonded thereto and the assembly is heated to carry out heat development and heat transfer at the same time. However, the heat developing section and the transferring section may be provided separately so as to carry out heat development and heat transfer separately.

In the embodiment illustrated in FIG. 1, the photosensitive element and the dye-fixing element are formed on separate supports. It is possible to form the photosensitive element and the dye-fixing element on a common support. Further, the photosensitive element and the dye-fixing element are separated at the end of heat development and heat transfer in the embodiment illustrated in FIG. 1 although another system may be employed which does not require final separation of the photosensitive element and the dye-fixing element.

Although the bonding, heating, and feeding means are illustrated as comprising a pair of contact rolls in the illustrated embodiments, any desired mechanical components may be used to achieve bonding, heating, and feeding functions. Similarly, the peeling, separating and conveying mechanisms are not limited to the illustrated ones.

The support 4 used herein may be formed from commonly used sheet-shaped material, for example, ordinary paper, fabrics, and resinous films. The most preferred support is ordinary paper.

Figure 2A:
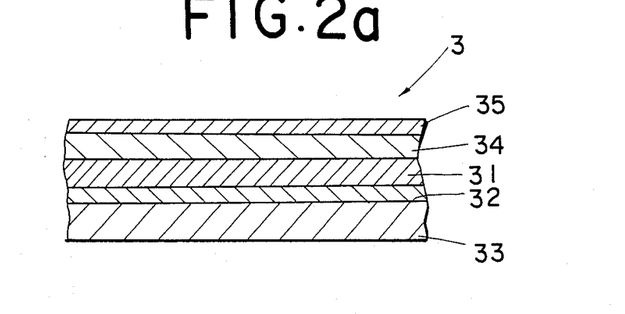
FIGS. 2a, 2b, and 2c are cross-sectional views of different examples of the dye-fixing element used in the embodiments of FIGS. 1 and 3.
Figure 2B:
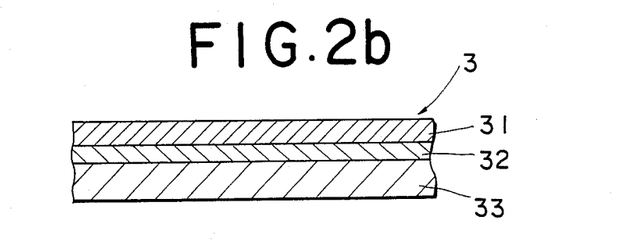
Figure 2C:
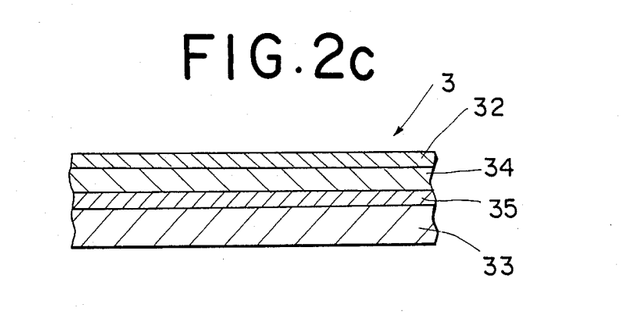

The dye-fixing element 3 used herein may have a variety of structure as shown in FIG. 2.

In FIG. 2a, the dye-fixing element 3 has a substrate 31, a dye-fixing or mordanting layer 34 on one surface of the substrate, and a protective layer 35 on the dye-fixing layer 34. A self-adhesive layer 32 is formed on the surface of the substrate 31 remote from the dye-fixing layer 34 (to be referred to as rear surface, hereinafter). The self-adhesive layer 32 is preferably covered by a tentative support 33 in the form of a release paper for protection. The provision of the tentative support 33 not only prevents the mordanting layer 34 from being contaminated during storage or transportation, but also prevents the dye-fixing elements from bonding to each other. In the practice of the present invention, the dye-fixing element 3 is bonded to the support 4 through the self-adhesive layer 32 in the bonding section 50 of the apparatus 1.

Generally, water application is necessary when a dye-fixing element of such structure is used.

The substrate 31 generally has a thickness of about 1 to about 200 μm, preferably from about 10 to about 100 μ. A thinner substrate is difficult to handle during preparation and developing and transferring processes so that the substrate may be crimpled, irregularly coated and torn during conveying. A thicker substrate is expensive in material cost and difficult to handle. The dye-fixing layer 34 generally has a thickness of from about 1 to about 50 μ, and the protective layer has a thickness of from about 0.1 to about 5 μ. The tentative support 33 has a thickness of from about 5 to about 200 μ, preferably from about 20 to about 100 μ.

The dye-fixing element 3 used in the present invention may have another structure as shown in FIG. 2b. The element has a substrate 31 which is formed from a dye-acceptable polymer so that the substrate can serve as both a substrate and a dye-fixing layer. The polymeric substrate 31 is provided on one surface (rear surface) with a self-adhesive layer 32 which is covered with a tentative support 33 for protecting the adhesive layer 32. The tentative support 33 may have approximately the same thickness as in the structure of FIG. 2a.

Generally, water application is unnecessary when a dye-fixing element of the structure of FIG. 2b is used.

The dye-fixing element 3 used in the present invention may have a further structure as shown in FIG. 2c. The element includes a tentative support 33, a protective layer 35, a dye-fixing layer 34, and a self-adhesive layer 32 placed one on another in this order.

Figure 3:
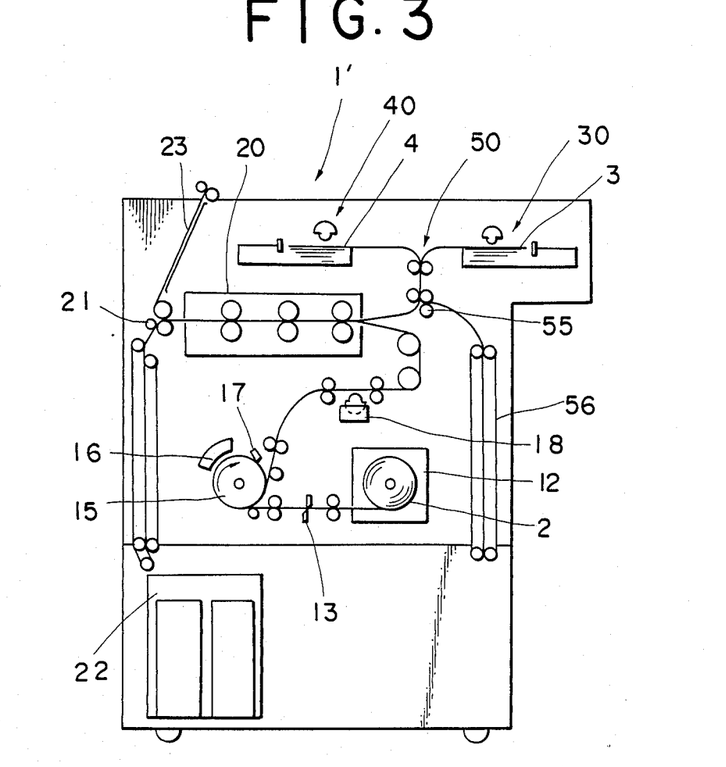
FIG. 3 is a schematic elevation of an image forming apparatus according to another embodiment of the present invention.

An image forming apparatus as shown in FIG. 3 is used to process the dye-fixing element 3 of the structure shown in FIG. 2c. The apparatus of FIG. 3 has substantially the same structure as that of FIG. 1. The only difference is an arrangement of the bonding section 50 and the peeler section 55 which are located between the dye-fixing element storing section 30 and the support storing section 40 on the way to the heat-developing/transferring section 20. In the embodiment illustrated in FIG. 3, the bonding section 50 is located upstream of the peeler section 55.

With this arrangement, the dye-fixing element 3 having the self-adhesive layer 32 as shown in FIG. 2c is bonded to the support 4 through the adhesive layer 32 in the bonding section 50 before the tentative support 33 is peeled away from the dye-fixing element 3 at the peeler section 55. In this case, the protective layer 35 beween the dye-fixing layer 34 and the tentative support 33 of the dye-fixing element 3 should function as a release layer.

Figure 4:
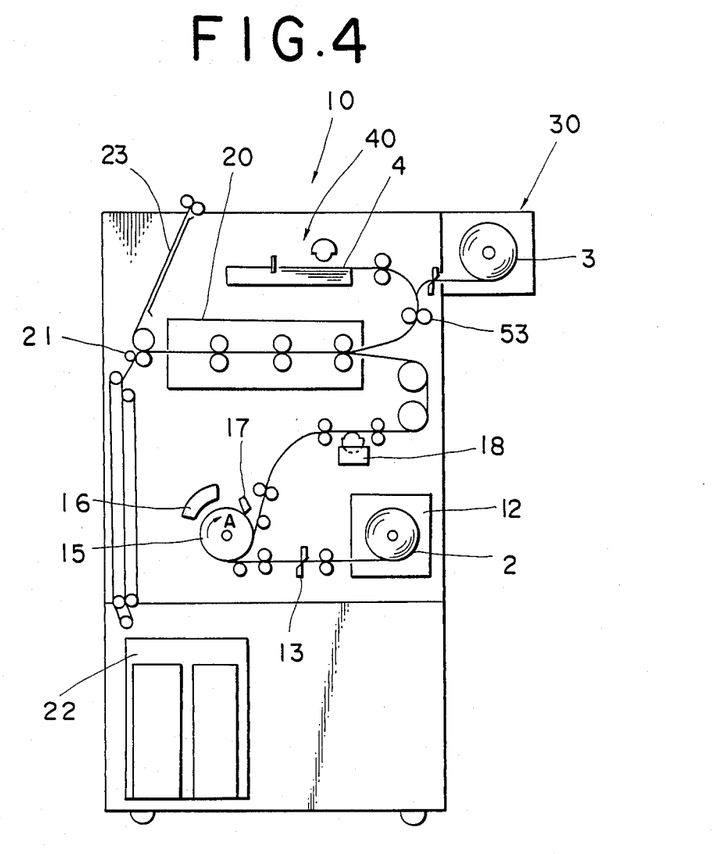
FIGS. 4 and 5 are schematic elevations of an image forming apparatus according to further embodiments of the present invention.
Figure 5:
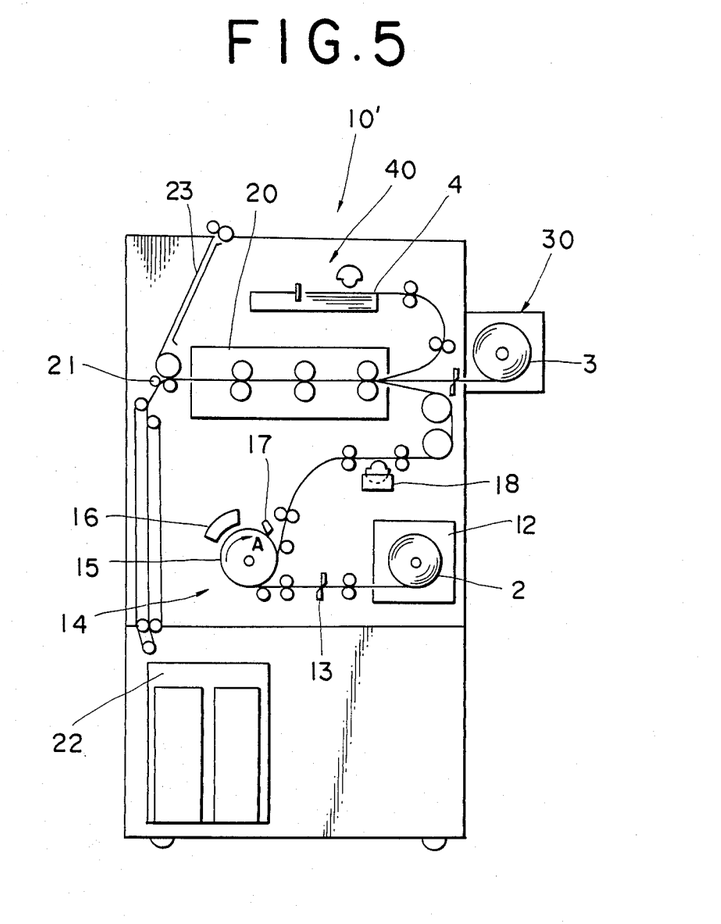

FIGS. 4 and 5 show other embodiments of the image forming apparatus of the present invention which are suitable for forming an image using a dye-fixing element having a hot-melt layer.

The apparatus of FIG. 4 has substantially the same structure as that of FIG. 1. The only difference resides in the structure of the dye-fixing element storage section and the bonding section 50. The section 30 is a receptacle for receiving a roll of dye-fixing element 3. Disposed in front of the section 30 is a cutter which cuts a web of dye-fixing element to a predetermined length. The bonding section 50 is located downstream of the sections 30 and 40 and upstream of the heat-developing/transferring section 20. The bonding section is illustrated as comprising a pair of heat rollers. The bonding section 50 not only functions to mate the dye-fixing element from the section 30 with the support from the section 40, but also heats them so that the dye-fixing element is heat bonded to the support through the hot-melt layer. To this end, the hot-melt layer is usually heated by the bonding section 50 to a temperature of about 180° to about 200° C.

Some hot-melt adhesive compositions may bond the dye-fixing element to the support when heated in the heat-developing/transferring section 20. Then the heating function of the bonding section 50 may be omitted. In this case, the heat-developing/transferring section 20 and the bonding section 50 together constitute heat bonding means.

The support 4 is in the form of a cut sheet in the embodiment shown in FIG. 4 although it may also be a length of support wound in a roll form. A cutter may be provided to cut the web to a predetermined length.

In the embodiment illustrated in FIG. 4, the dye-fixing element 3 is heat bonded to the support 4 at the heat bonding section 50 before they are placed in contact with the photosensitive element 2 in the heat-developing/transferring section 20. The apparatus of FIG. 5 is different from that of FIG. 4 in that the heat bonding section 50 is eliminated and all the members from the storage sections 12, 30 and 40 are directly fed to the section 20 where heat bonding and contact placement are conducted at the same time. The section 20 plays all the roles of heat bonding, contact placement, heat development, and dye transfer.

Many modifications and changes may be made in the embodiments of FIGS. 4 and 5 as described in the embodiment of FIG. 1 with respect to its mechanical sections and photographic elements.

Figure 6A:
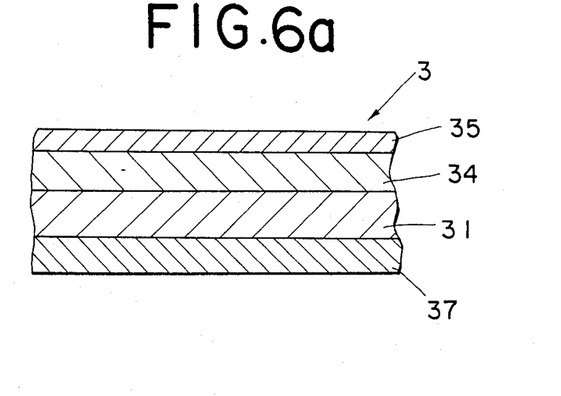
FIGS. 6a, 6b, and 6c are cross-sectional views of different examples of the dye-fixing element used in the embodiments of FIGS. 4 and 5.
Figure 6B:
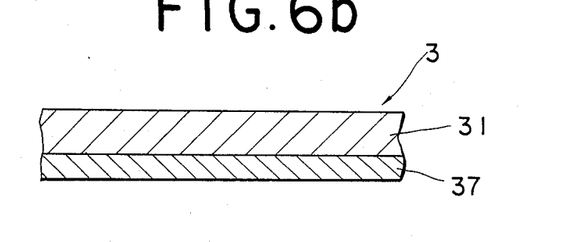
Figure 6C:
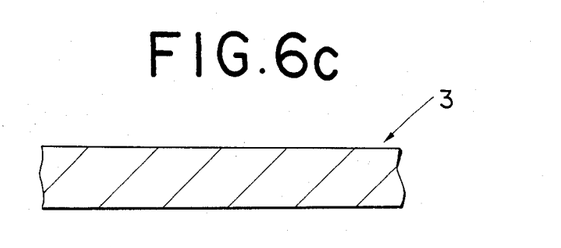

The dye-fixing element 3 used in the embodiments of FIGS. 4 and 5 may have a variety of structure as shown in FIG. 6.

In FIG. 6a, the dye-fixing element 3 has a substrate 31, a dye-fixing or mordanting layer 34 on one surface of the substrate, and a protective layer 35 on the dye-fixing layer 34. A hot-melt layer 37 is formed on the surface of the substrate 31 remote from the dye-fixing layer 34 (to be referred to as rear surface, hereinafter).

In the practice of the present invention, the dye-fixing element 3 is bonded to the support 4 through the hot-melt layer 37 in the bonding section 50 of the apparatus 1.

Generally, water application is necessary when a dye-fixing element of such structure is used.

The substrate 31 generally has a thickness of about 1 to about 200 μ, preferably from about 10 to about 100 μ. A thinner substrate is difficult to handle during preparation and developing and transferring processes so that the substrate may be crimpled, irregularly coated and torn during conveying. A thicker substrate is expensive in material cost and difficult to handle. The dye-fixing layer 34 generally has a thickness of from about 1 to about 50 μ, and the protective layer 35 has a thickness of from about 0.1 to about 5 μ. The hot-melt layer 37 on the rear surface of the substrate 31 generally has a thickness of from about 1 to about 100 μ, preferably from about 5 to about 50 μ. A thinner hot-melt layer will provide insufficient bonding whereas a thicker hot-melt layer will dull the texture of the support 4.

The dye-fixing element 3 used in the present invention may have another structure as shown in FIG. 6b. The element has a substrate 31 which is formed from a dye-acceptable polymer so that the substrate can serve as both a substrate and a dye-fixing layer. The polymeric substrate 31 is provided on one surface (rear surface) with a hot-melt layer 37. The hot-melt layer 37 may have approximately the same thickness as in the structure of FIG. 6a.

The dye-fixing element 3 used in the present invention may have a further structure as shown in FIG. 6c wherein the polymeric substrate 31 and the hot-melt layer 37 of FIG. 6b are combined into a single layer. The dye-fixing element 3 is formed of material having both dye-accepting and hot-melting functions.

Generally, water application is unnecessary when a dye-fixing element of the structure of FIG. 6b or 6c is used.

In the practice of the present invention, the dye-fixing element 3 shown in FIG. 2a has the dye-fixing layer 34 which contains a mordant, preferably a polymeric mordant.

The polymeric mordant used herein includes polymers containing a tertiary amino group, polymers having a nitrogeneous heterocyclic moiety, and polymers having a quaternary cation group of such type. Preferably the polymeric mordant is used in admixture with another hydrophilic polymer such as gelatin.

Examples of polymers containing a vinyl monomer unit having a tertiary amino group are given in Japanese Patent Application Kokai Nos. 60-57836 and 60-60643. Examples of polymers containing a vinyl monomer unit having a tertiary imidazole group are described in U.S. Pat. Nos. 3,148,061, 4,115,124, and 4,282,305, Japanese Pat. App. Kokai Nos. 60-118834 and 60-122941, and Japanese Pat. App. Nos. 61-87180 and 61-87181. Examples of polymers containing a vinyl monomer unit having a quaternary imidazolium salt are described in British Pat. Nos. 1,594,961, 2,056,101, and 2,093,041, U.S. Pat. Nos. 4,115,124, 4,124,386, 4,273,853, and 4,450,224 and Japanese Pat. App. Kokai No. 48-28225. Examples of polymers containing a vinyl monomer unit having a quaternary ammonium salt are described in U.S. Pat. Nos. 3,709,690, 3,898,088, and 3,958,995 and Japanese Pat. App. Kokai Nos. 60-57836, 60-60643, 60-122940, 60-122942 and 60-235134.

The polymeric mordants used herein may have a molecular weight of from about 1,000 to about 1,000,000, more preferably from about 10,000 to about 200,000.

The polymeric mordant is generally used in admixture with a hydrophilic colloid binder in a mordanting layer of the dye-fixing element.

Typical examples of the hydrophilic colloid used herein as the binder include natural substances, for example, proteins such as gelatin and gelatin derivatives and polysaccharides such as cellulose derivatives, starch, dextran, pluran, and gum arabic as well as synthetic polymers such as polyvinyl alcohol, polyvinyl pyrrolidone and polyacrylamide. Preferred hydrophilic colloids are gelatin and polyvinyl alcohol.

The mixing ratio of polymeric mordant to hydrophilic colloid and the amount of polymeric mordant coated may be readily determined by those skilled in the art depending on the amount of dye to be mordanted, the type and composition of polymeric mordant, and the image forming process involved. In general, the ratio of polymeric mordant to hydrophilic colloid ranges from about 20/80 to about 80/20 on a weight basis. The weight of polymeric mordant coated preferably ranges from about 0.2 to about 15 g/m$^2$, more preferably from about 0.5 to about 8 g/m$^2$.

The polymeric mordant may be used in combination with a metal ion in the dye-fixing element to increase the density of the dye transferred. The metal ion may be added to a mordanting layer or a protective layer. The metal ion used herein is preferably colorless and stable against heat and light. Preferred examples of the metal ion include polyvalent ions of transition metals such as $Cu^{2+}$, $Zn^{2+}$, $Ni^{2+}$, $Pt^{2+}$, $Pd^{2+}$, and $Co^{3+}$, with $Zn^{2+}$ being most preferred. The metal ion is generally added in the form of a water-soluble compound, for example, $ZnSO_4$ and $Zn(CH_3COO)_2$ in an amount of about 0.01 to about 5 g/m$^2$, more preferably from about 0.1 to about 1.5 g/m$^2$.

The layer to which the metal ion is added may contain a hydrophilic polymer as a binder. The hydrophilic colloids which are previously described in conjunction with the mordanting layer are useful as the hydrophilic binder.

The dye-fixing element may optionally be provided with any desired auxiliary layers including protective, release, and anti-curling layers. Particularly useful is a protective layer. One or more of these auxiliary layers may contain hydrophilic thermal solvents, plasticizers such as oils and polymer latexes having a low glass transition temperature, anti-fading agents, UV absorbers, lubricants, matte agents; antioxidants, dispersed vinyl compounds for enhancing dimensional stability, surface-active agents, and brighteners. Particularly in a system wherein heat development and dye transfer are carried out at the same time in the presence of a small amount of water, a base and/or base precursor is preferably contained in the dye-fixing element because the photosensitive element which is thus base free is increased in shelf stability. Examples of these additives are described in Japanese Patent Application Kokai No. 61-88256.

The substrate 31 of the dye-fixing element 3 shown in FIG. 2a may be formed from the material which is usually used as a support for photosensitive and dye-fixing elements. Examples of the substrate material include acetyl cellulose films, cellulose ester films, polyvinyl acetal films, polystyrene films, polycarbonate films, polyethylene terephthalate films, and similar films and other resinous materials. Paper supports having laminated thereon a polymer such as polyethylene may also be used. The polyesters described in U.S. Pat. Nos. 3,634,089 and 3,725,070 are useful.

The polymeric substrate 31 of the dye-fixing element 3 shown in FIG. 2b may be formed from dye-acceptable polymers such s heat-resistant organic high molecular weight compounds having a glass transition temperature of from about 40° to about 250° C.

The mechanism through which a dye released from a dye-providing substance enters a polymer has not been fully understood. In general, it is believed that the thermal motion of a polymer chain is enhanced at a processing temperature of above the glass transition temperature, to create interstices between chain molecules so that the dye can enter the interstices. For this reason, if a layer containing an organic high molecular weight substance having a glass transition temperature of from about 40° C. to about 250° C. is used as the dye-fixing layer, then there is obtained a clear image in which only the dye has entered the dye-fixing layer because the dye-fixing layer discriminates the dye from the dye-providing substance.

Examples of the organic high molecular weight substance used herein include polystyrenes having a molecular weight of from about 2,000 to about 85,000, polystyrene derivatives with a substituent having up to 4 carbon atoms, polyvinylcyclohexane, polydivinylbenzene, polyvinyl pyrrolidone, polyvinylcarbazole, polyallylbenzene, polyvinyl alcohol, polyacetals such as polyvinyl formal and polyvinyl butyral, polyvinyl chloride, chlorinated polyethylene, polyethylene trichlorofluoride, polyacrylonitrile, poly-N,N-dimethylacrylamide, polyacrylates having a p-cyanophenyl, pentachlorophenyl or 2,4-dichlorophenol group, polyesters such as poly(acryl chloroacrylate), poly(methyl methacrylate), poly(ethyl methacrylate), poly(propyl methacrylate), poly(isopropyl methacrylate), poly(isobutyl methacrylate), poly(tert.-butyl methacrylate), poly(cyclohexyl methacrylate), polyethylene glycol dimethacrylate, poly-2-cyanoethyl methacrylate, and polyethylene terephthalate, polysulfone, polycarbonates such as bisphenol-A polycarbonate, polyanhydrides, polyamides, and cellulose acetates. Also useful are those synthetic polymers having a glass transition temperature between 40° C. and 250° C. described in J. Brandrup & E. H. Immergut Ed., "Polymer Handbook," 2nd Edition, John Wiley & Sons. These high molecular weight substances may be used alone or in admixture or two or more of them may be combined to form a copolymer.

The polymeric substrate 31 may be a polymeric layer which itself has no dye-fixing function as long as a layer of the above-mentioned synthetic polymer having a dye-fixing function is coated or laminated thereon.

The dye-fixing element 3 used in the structure of FIG. 2 has the self-adhesive layer 32 which is formed from a bonding composition.

The bonding composition is applied as a layer to the rear surface of the substrate or polymeric substrate 31 of the dye-fixing element 3 so that the substrate can be quickly bonded to another object at a sufficient bond strength by any desired means including pressure, heat, light, solvent and chemical reaction. The bonding composition is predominantly comprised of a high molecular weight substance capable of providing high agglomeration and elasticity. Synthetic polymers and elastomers are used in most cases. In addition, there is contained a high molecular weight substance capable of providing adherence and known as a tackifier. Softeners and fillers may also be contained for the purposes of adjusting viscosity and agglomerating force, increasing the interfacial bonding force between the rear surface of the substrate or polymeric substrate 31 or the support 4 with the bonding composition, and making it easy to form a thin layer. Antioxidants and oxygen barrier agents may be used for the purposes of stabilizing an image, and achieving discoloration prevention, stabilization and antibacterial preservation of the self-adhesive layer 32.

Examples of the bonding agent include synthetic polymers and elastomers, such as polyacrylate, acrylic copolymers, vinyl chloride-vinyl acetate copolymers, polyvinyl butyral, polyvinyl isobutyl ether, polyvinyl alcohol, natural rubber, SBR, butyl rubber, polyisoprene rubber, regenerated rubber, chloroprene, polyisobutylene, silicone rubber, chlorinated rubber, and chlorinated butyl rubber.

Examples of the tackifier include rosin, ester gum, polyolefinic petroleum resin, polyterpene polymers, cumarone-indene polymers, styrenic polymers, phenol resins, xylenic polymers, gum arabic, dextrine and glue.

Examples of the softener include plasticizers for the above-listed high molecular weight substances, polybutene, polyisobutylene low polymers, polyvinyl isobutyl ether low polymers, rosin oil, depolymerized rubber, lanolin, wax and vegetable oil.

Examples of the filler include titanium oxide, silica, alumina, barium sulfate, starch, clay, and polymeric fine particulate latex.

Examples of the antioxidant include hydroquinones such as 2,5-di-tert.-butylhydroquinone, phenols such as 2,6-di-tert.-butyl-4-methylphenol, 1,1-bis(4-hydroxyphenol)cyclohexane, p-alkoxyphenols, bisphenols, hindered phenols, aminophenols, cumarones such as 6-hydroxycumarones, 5-hydroxycumarones and spirocumarones, gallic acid derivatives, aminophenols, and hindered amines.

Examples of the stabilizer and antibacterial agent include benzoisothiazoline, isothiazolone, 4-thiazolinebenzimidazole, halogenated phenols, sulfanylamide, and benzotriazole.

A mixture of these ingredients is applied as a self-adhesive layer in an amount of from about 0.1 to 30 g/m², preferably from about 0.5 to about 20 g/m².

The method of application may be selected from application methods commonly used for adhesive tape, adhesive sheets, labels, album fillers, and stickers. A choice may be made of the application methods described in Japanese Patent Application Kokai Nos. 60-41950, 61-23673, 61-60771, 61-83276, 61-103975, 61-148279, 61-148282, and 61-174283 and Japanese Patent Application No. 61-179559.

A release sheet may be used as the tentative support for the dye-fixing element. Examples of the release sheet include silicone and Teflon coated papers, cellophane, films such as polyethylene, polypropylene, polyvinyl chloride, triacetyl cellulose (TAC), and polyethylene terephthalate (PET) films, synthetic paper, and aluminum foil. Preferred is a release sheet that provides a weaker bonding force between the release sheet and the self-adhesive layer than between the rear surface of the substrate or polymeric substrate of the dye-fixing element and the self-adhesive layer. For example, polyalkylene-laminated paper, PET film, and aluminum foil all having a thickness in the range of from about 20 μ to about 150 μ are more preferred.

The rear surface of the substrate or polymeric substrate of the dye-fixing element may preferably be subjected to a corona discharge treatment, electron radiation exposure, or flame treatment to enhance its affinity or bonding force to a primer layer or a self-adhesive layer. If desired, a primer layer is formed on the substrate or polymeric substrate. The primer used should have high compatibility and affinity to the self-adhesive layer and the substrate or polymeric substrate of the dye-fixing element.

The dye-fixing element may be provided on its rear surface with a primer layer, a self-adhesive layer, and then a release sheet. It is also possible to apply a self-adhesive layer on a silicone- or Teflon-coated surface of a release sheet, separately subject the rear surface of a substrate or polymeric substrate of the dye-fixing element to a corona treatment, and laminate the release sheet and the substrate through the self-adhesive layer. Alternatively, it is possible to apply a first self-adhesive layer to the rear surface of the substrate of the dye-fixing element, apply a second self-adhesive layer to a release sheet, and laminate the substrate and the release sheet through the first and second self-adhesive layers. The resulting self-adhesive layer has a two-layer structure of the first and second self-adhesive layers.

The self-adhesive layer used in the practice of the present invention may also be obtained by applying the same or different self-adhesive layers onto both the surfaces of a thin sheet or tape to form a double-sided adhesive tape, and applying a release sheet to one adhesive layer of the tape, and applying the substrate or polymeric substrate of the dye-fixing element on its rear surface to the other adhesive layer of the tape.

The surface of the release sheet which is remote from the self-adhesive layer may preferably be coated with an anti-adhesion agent such as an organic matte agent so that the remote surface is anti-adherent to the dye-fixing layer coating.

Since the self-adhesive layer and release sheet used in the practice of the present invention are brought in indirect contact with the photosensitive element, it is preferred to avoid the use of the material which would fog, desensitize contaminate, or unstabilize the photosensitive element.

Next, the dye-fixing elements having the structures shown in FIGS. 6a, 6b and 6c are described.

The substrate or polymeric substrate 31 and the dye-fixing layer 34 may be made from the same materials as described in conjunction with FIG. 2.

The dye-fixing element of FIG. 6a or 6b has the hot-melt layer 37. The hot-melt layer 37 is formed from a hot-melt adhesive composition generally comprising a base polymer or base resin, wax, tackifier, softener, filler and antioxidant.

The base polymers used herein are generally thermoplastic polymers including polyethylene, ethylene-vinyl acetate (EVA) copolymers, modified EVA copolymers (such as partially saponified ethylene-vinyl alcohol-vinyl acetate ternary copolymers), entirely saponified ethylene-vinyl alcohol binary copolymers, ethylene-vinyl alcohol-carboxylic acid ternary copolymers, ethylene-acrylate copolymers, ionomers (such as Surlyn A manufactured by duPont), propylene, polyamides, polyesters, vinyl acetate-chrotonic acid copolymers, vinyl acetate-phthalic anhydride copolymers, vinyl acetate-vinyl pyrrolidone copolymers, cellulose derivatives, polymethyl methacrylate, polyvinyl ether, and polyurethane. Some thermosetting resins are also useful.

The tackifier, softener, filler, antioxidant and other ingredients of the hot-melt adhesive composition are approximately the same as those of the bonding composition.

The hot-melt adhesive composition may be applied by any desired one of the application methods described in Hiroshi Fukada, "Shin Kobunshi Bunko Series No. 16 - Practical Hot-Melt Adhesive," Kobunshi-Kankokai, pages 197–215.

The hot-melt layer preferably has a melting temperature in the range of from about 100 to about 180° C.

The rear surface of the substrate or polymeric substrate of the dye-fixing element may preferably be subjected to a corona discharge treatment, electron radiation exposure, or defect treatment to enhance its affinity or bonding force to a primer layer or a hot-melt layer. If desired, a primer layer is formed on the substrate or polymeric substrate. The primer used should have high compatibility and affinity to the hot-melt and the substrate or polymeric substrate of the dye-fixing element.

The dye-fixing element may be provided on its rear surface with a primer layer and a hot-melt layer. It is also possible to apply a hot-melt layer to the corona treated surface of a substrate or polymeric substrate of the dye-fixing element.

Since the hot-melt layer and other layers used in the practice of the present invention are brought in indirect contact with the photosensitive element, it is preferred to avoid the use of the material which would fog, desensitize, contaminate, or unstabilize the photosensitive element.

The photosensitive element 2 used in the practice of the present invention may be selected from the photosensitive elements described in U.S. Pat. Nos. 4,430,415, 4,483,914, 4,500,626, and 4,503,137, Japanese Patent Application Kokai Nos. 59-154445, 59-165054, 59-180548, 59-218443, 60-120356, and 61-88256, Japanese Patent Application Nos. 60-79709, 60-169585, and 60-244873.

The silver halide used herein may be selected from silver chloride, silver bromide, silver chlorobromide, silver chloroiodide, and silver chloroiodobromide, but is not limited thereto.

Any desired silver halide emulsions may be used as described in U.S. Pat. No. 4,500,626, col. 50, Research Disclosure, June 1978, pages 9–10 (RD 17029), Japanese Patent Application Kokai No. 61-107240, and Japanese Patent Application Nos. 60-225176 and 60-228267.

The silver halide emulsion used herein may be either of a surface latent image type wherein a latent image is formed on the grain surface or of an internal latent image type wherein a latent image is formed in the grain interior. A core-shell emulsion of grains having a core and a shell of different phases may also be used as well as a direct reversal emulsion comprising an internal latent image type emulsion combined with a nucleating agent.

The silver halide emulsion may be used without post-ripening, but usually chemically sensitized. For chemical sensitization purpose there may be employed sulfur sensitization, reducing sensitization, noble metal sensitization, and combinations thereof which are well known with conventional photosensitive material-forming emulsions. Chemical sensitization may be carried out in the presence of a nitrogeneous heterocyclic compound as disclosed in Japanese Patent Application Kokai Nos. 58-126526 and 58-215644.

The amount of the photosensitive silver halide emulsion coated in the practice of the present invention ranges from about 1 mg to about 10 mg of silver per square meter.

In the practice of the present invention, silver may be used as an image forming material. Another image forming material used herein is a compound which, when silver ion is reduced into silver at elevated temperatures, produces or releases a mobile or diffusible dye in direct or inverse proportion to the reaction. These compounds are simply referred to as dye-providing substances hereinafter.

Typical of the dye-providing substances which can be used in the present invention are compounds capable of forming a dye through oxidative coupling reaction, that is, couplers. The couplers may be four- or two-equivalent couplers. Also useful is a two-equivalent coupler which has an anti-diffusion group as a coupling-off group so that it forms a diffusible dye through oxidative coupling reaction. Illustrative examples of the developing agents and couplers are described in detail in, for example, T. H. James, "The Theory of the Photographic Process", 4th Ed., pages 291–334 and 354–361, as well as the following Japanese Patent Application Kokai Nos.

| | | |
|---|---|---|
| 58-123533, | 58-149046, | 58-149047, |
| 59-111148, | 59-124399, | 59-174835, |
| 59-231539, | 59-231540, | 60-2950, |
| 60-2951, | 60-14242, | 60-23474, |
| 60-66249. | | |

Another example of the dye-providing substance is a compound having the function of releasing or diffusing a diffusible dye imagewise. The compounds of this type may be represented by the following formula [L I]:

$$(Dye-X)_n-Y \qquad [L\ I]$$

wherein Dye represents a dye group, a temporary short-waved dye group, or a dye precursor group; X represents a valence bond or a bridging linkage; and Y represents a group which, in correspondence or counter-correspondence to photosensitive silver salt having a latent image distributed imagewise, produces a difference in diffusibility of the compound represented by $(Dye-X)_n-Y$ or releases Dye, the diffusibility of Dye released being different from that of the compound represented by $(Dye-X)_n-Y$, and n represents an integer of 1 or 2, when n=2, the Dye-X's may be the same or different.

Exemplary of the dye-providing substances having general formula [L I] there may be given dye developing agents in the form of a hydroquinone-type developing agent having a dye moiety attached thereto as disclosed in U.S. Pat. Nos. 3,134,764; 3,362,819; 3,597,200; 3,544,545 and 3,482,972. In addition, substances which release a diffusible dye through intramolecular nucleophilic substitution reaction are disclosed in U.S. Pat. No. 3,980,479 and substances which releases a diffusible dye through intramolecular rewind reaction of an isooxazolone ring are disclosed in Japanese Patent Application Kokai No. 49-111628.

Another system is proposed wherein the dye-providing substance is previously modified into an oxidant form having no dye releasing ability so that the modified substance may coexist with a reducing agent or precursor thereof. After development, the reducing agent which remains non-oxidized acts on the modified substance to reduce it, thereby releasing the diffusible dye. Typical examples of the dye-providing substances usable in such a system are described in Japanese Patent Application Kokai Nos. 53-35533, 53-110827, 54-130927, and 56-164342. Dye-providing substances which release a diffusible dye through a similar mechanism are also known in Japanese Patent Application No. 60-244873 which discloses compounds capable of releasing a diffusible dye upon cleavage of an N—O bond by the remainder of reducing agent.

Also useful is a non-diffusible compound (LDA compound) which releases a diffusible dye through donor-acceptor reaction in the presence of a base, but substantially stops dye release when reacted with an oxidant of the reducing agent as disclosed in Japanese Patent Application Kokai No. 59-185333.

In the systems to which these substances are applied, a diffusible dye is released or diffused where no development has taken place and no dye is released or diffused where development has taken place.

Also known are substances which release a diffusible dye where development has occurred. The substances which release a diffusible dye through reaction with an oxidant of the reducing agent are known as DDR couplers, that is, couplers having a diffusible dye as an eliminatable group, and described in British Patent No. 1,330,524, Japanese Patent Publication No. 48-39165, and U.S. Pat. No. 3,443,940.

The systems using these color developing agents have the serious problem that the resulting image can be contaminated with oxidation decomposition products of a reducing agent. To overcome this problem, a dye-releasing compound (DRR compound) has been proposed which itself has a reducing ability and does not need a reducing agent. Typical examples of these dye-providing substances are described in the following patents.

U.S. Pat. Nos.

| | | |
|---|---|---|
| 3,443,939, | 3,725,062, | 3,728,113, |
| 3,928,312, | 4,053,312 | 4,055,428 |
| 4,336,322 | 4,500,626 | |

Japanese Patent Application Kokai Nos.

| | | |
|---|---|---|
| 51-104343, | 53-3819, | 57-179840, |
| 58-116537 | 59-65839, | 59-69839, |

Research Disclosure No. 17465.

Exemplary of the dye-providing substances which can be used in the practice of the present invention there may be given those compounds described in U.S. Pat. No. 4,500,626, columns 22–44, with the compounds identified therein as compound Nos. (1)–(3), (10)–(13), (16)–(19), (28)–(30), (33)–(35), (38)–(40), and (42)–(64) being favorable among others. Also useful are the compounds described in Japanese Patent Application Kokai No. 61-124941.

Other useful dye-providing substances include dye-silver compounds having an organic silver salt combined with a dye as disclosed in Research Disclosure, May 1978, pages 54–58, azo dyes used in a heat developing silver dye bleaching method as disclosed in U.S. Pat. No. 4,235,957 and Research Disclosure, April 1976, pages 30–32, and leuco dyes as disclosed in U.S. Pat. Nos. 3,985,565 and 4,022,617.

The binder used in the photosensitive element in the practice of the present invention may be selected from the binders which are previously described in conjunction with the dye-fixing element.

Other additives are described in the literature and patent publications which are incorporated herein by reference in conjunction with the photosensitive element.

The image forming apparatus according to the present invention allows an image to be formed on a dye-fixing element on a support of commonly available material like ordinary paper. The apparatus has an economic advantage of low cost image formation and an aesthetic or artistic advantage that an image of quality reflecting the quality of the support can be readily formed.

EXAMPLES

In order that those skilled in the art may better understand how the present invention is practiced, the following examples are given by way of illustration and not by way of limitation.

Example 1

Preparation of Silver Halide Emulsions

A silver halide emulsion used in fifth and first layers was prepared as follows.

An aqueous gelatin solution was prepared by dissolving 20 grams of gelatin and 3 grams of sodium chloride in 1000 ml of water and kept at a temperature of 75° C. While fully agitating the gelatin solution, 600 ml of an aqueous solution of sodium chloride and potassium bromide and another aqueous solution of 0.59 mol of silver nitrate in 600 ml of water were concurrently added to the gelatin solution at an equal flow rate over a period of 40 minutes. In this way, there was prepared a monodispersed cubic silver chlorobromide emulsion having an average grain size of 0.40 μm (bromine 50 mol %).

After rinsing with water and desalting, 5 mg of sodium thiosulfate and 20 mg of 4-hydroxy-6-methyl-1,3,3a,7-tetra-azaindene were added to effect chemical sensitization at 60° C. There was obtained an emulsion in a yield of 600 grams.

A silver halide emulsion used in a third layer was prepared as follows.

An aqueous gelatin solution was prepared by dissolving 20 grams of gelatin and 3 grams of sodium chloride in 1000 ml of water and kept at a temperature of 75° C. While fully agitating the gelatin solution, 600 ml of an aqueous solution of sodium chloride and potassium bromide and another aqueous solution of 0.59 mol of silver nitrate in 600 ml of water were concurrently added to the gelatin solution at an equal flow rate over a period of 40 minutes. In this way, there was prepared a monodispersed cubic silver chlorobromide emulsion having an average grain size of 0.35 μm (bromine 80 mol%).

After water rinsing and desalting, 5 mg of sodium thiosulfate and 20 mg of 4-hydroxy-6-methyl-1,3,3a,7-tetra-azaindene were added to effect chemical sensitization at 60° C. There was obtained an emulsion in a yield of 600 grams.

Preparation of Silver Acetylene Emulsion

A dispersion of silver acetylene was prepared by dissolving 20 grams of gelatin and 4.6 grams of 4-acetylaminophenyl acetylene in 1000 ml of water and 200 ml of ethanol. The solution was agitated at 40° C. To the solution was added 4.5 grams of silver nitrate in 200 ml of water over a period of 5 minutes. The dispersion was adjusted to such pH that an excess salt precipitated, and the excess salt was removed. The dispersion was adjusted to pH 6.3, obtaining a silver acetylene dispersion in a yield of 300 grams.

Next, a dispersion of a dye-providing substance in gelatin was prepared as follows.

Preparation of Gelatin Dispersion of Dye-Providing Substance

Five (5) grams of yellow dye-providing substance (A) having the formula shown below was dissolved together with 0.5 grams of succinic acid-2-ethylhexyl ester sodium sulfonate surface-active agent and 10 grams of triisononyl phosphate in 30 ml of ethyl acetate by heating at about 60° C., obtaining a homogeneous solution. The solution was mixed with 100 grams of a 10 wt% lime-treated gelatin solution by agitation, and the mixture was dispersed with a homogenizer for 10 minutes at 10,000 rpm. This dispersion is called yellow dye-providing substance dispersion.

Magenta dye-providing substance dispersion was prepared by the same procedure as above except that magenta dye-providing substance (B) and 7.5 grams of tricresyl phosphate as the high-boiling solvent were used.

Cyan dye-providing substance dispersion was prepared by the same procedure as the yellow dye-providing substance dispersion except that cyan dye-providing substance (C) was used.

A color photosensitive element of the following multi-layer structure was formed using these preparations.

TABLE 1

| Formulation of Photosensitive Element |
|---|
| Sixth layer |
| gelatin (coating weight 800 mg/m$^2$) |
| hardener*$^3$ (coating weight 16 mg/m$^2$) |
| zinc hydroxide (coating weight 300 mg/m$^2$) |
| Fifth layer: Green-sensitive emulsion layer |
| silver chlorobromide emulsion (bromine 50 mol %, coating weight 500 mg/m$^2$ of Ag) |
| silver acetylene emulsion (coating weight 150 mg/m$^2$ of Ag) |
| benzotriazole (coating weight 30 mg/m$^2$) |
| sensitizing dye D-1 (coating weight $10^{-6}$ mol/m$^2$) |
| hardener*$^3$ (coating weight 16 mg/m$^2$) |
| yellow dye-providing substance (A) (coating weight 400 mg/m$^2$) |
| gelatin (coating weight 1000 mg/m$^2$) |
| high-boiling solvent*$^4$ (coating weight 800 mg/m$^2$) |
| surface-active agent*$^2$ (coating weight 100 mg/m$^2$) |
| Fourth layer: Intermediate layer |
| gelatin (coating weight 900 mg/m$^2$) |
| hardener*$^3$ (coating weight 18 mg/m$^2$) |
| zinc hydroxide (coating weight 300 mg/m$^2$) |
| Third layer: Red-sensitive emulsion layer |
| silver chlorobromide emulsion (bromine 80 mol %, coating weight 400 mg/m$^2$ of Ag) |
| silver acetylene emulsion (coating weight 150 mg/m$^2$ of Ag) |
| benzotriazole (coating weight 30 mg/m$^2$) |
| sensitizing dye D-2 (coating weight $8 \times 10^{-7}$ mol/m$^2$) |
| hardener*$^3$ (coating weight 18 mg/m$^2$) |
| magenta dye-providing substance (B) (coating weight 400 mg/m$^2$) |
| gelatin (coating weight 1000 mg/m$^2$) |
| high-boiling solvent*$^1$ (coating weight 600 mg/m$^2$) |
| surface-active agent*$^2$ (coating weight 100 mg/m$^2$) |
| Second layer: Intermediate layer |

TABLE 1-continued
Formulation of Photosensitive Element gelatin (coating weight 800 mg/m$^2$)
hardener*$^3$ (coating weight 16 mg/m$^2$)
zinc hydroxide (coating weight 300 mg/m$^2$)
First layer: Infrared-sensitive emulsion layer
silver chlorobromide emulsion (bromine 50 mol %, coating weight 300 mg/m$^2$ of Ag)
silver acetylene emulsion (coating weight 150 mg/m$^2$ of Ag)
benzotriazole (coating weight 30 mg/m$^2$)
sensitizing dye D-3 (coating weight 10$^{-8}$ mol/m$^2$)
hardener*$^3$ (coating weight 16 mg/m$^2$)
cyan dye-providing substance (C) (coating weight 300

TABLE 1-continued
Formulation of Photosensitive Element mg/m$^2$)
gelatin (coating weight 1000 mg/m$^2$)
high-boiling solvent*$^4$ (coating weight 600 mg/m$^2$)
surface-active agent*$^2$ (coating weight 100 mg/m$^2$)

Support
*$^1$tricresyl phosphate

*$^3$1,2-bis(vinylsulfonylacetamide)ethane
*$^4$(iso-C$_9$H$_{19}$O)$_3$P=O

Dye-providing substance (A)

Dye-providing substance (B)

Dye-providing substance (C)

Sensitizing dye (D-1)

Sensitizing dye (D-2)

Sensitizing dye (D-3)

Separately, a dye-fixing element having the structure shown in FIG. 2a was prepared a shown in Table 2.

| TABLE 2 | |
|---|---|
| Formulation of Dye-Fixing Element | |
| Ingredient | Amount (g/m²) |
| Third layer: protective layer | |
| Vinyl alcohol-acrylic acid (75/25 molar ratio) copolymer | 0.25 |

| TABLE 2-continued | |
|---|---|
| Formulation of Dye-Fixing Element | |
| Ingredient | Amount (g/m²) |
| Surface-active agent A*¹ | 0.02 |
| Surface-active agent B*² | 0.1 |
| Second layer: dye-fixing layer | |
| Gelatin | 1.4 |
| Dextran (MW 70,000) | 1.4 |
| Mordant*³ | 2.8 |

TABLE 2-continued

| Formulation of Dye-Fixing Element | |
|---|---|
| Ingredient | Amount (g/m$^2$) |
| Oil droplet*[4] | 1.8 |
| Guanidium picolinate | 2.4 |
| First layer | |
| Gelatin | 0.4 |
| Hardener A*[5] | 0.3 |
| Substrate | |
| Polyethylene terephthalate*[6] containing TiO$_2$ white pigment (thickness 25 μm) | |
| First layer: self-adhesive layer | |
| Product emulsion polymerized from | 95 pbw |
| 2-ethylhexyl acrylate | 80 pbw |
| methyl methacrylate | 18 pbw |
| acrylic acid | 2 pbw |
| n-dodecylmercaptan | 0.2 pbw |
| Titanium oxide | 5 pbw |
| Release paper *[7] (thickness 50 μm) | |

*[1]Surface-active agent A

*[2]Surface-active agent B

*[3]Mordant

*[4]Oil droplet

Preparation and addition of oil droplets

To 100 grams of an aqueous solution of 10% gelatin were added 5 ml of an aqueous solution of 5% sodium dodecylbenzene sulfonate and then 20 grams of fluidized paraffin. The mixture was dispersed and emulsified by a homoblender at 10,000 rpm for 6 minutes, obtaining a dispersion of oil droplets. This dispersion was added to a coating composition for a dye-fixing layer (second layer).

*5 Hardener A

*6 PET substrate was treated with a corona discharge.
*7 Release paper coated with a silicone release agent.

The support used was a sheet of ordinary paper having a thickness of 80 μm.

The image forming apparatus 1 shown in FIG. 1 was loaded with the above-mentioned photosensitive element, dye-fixing element and support. The apparatus was operated to take up the photosensitive element 2 from the roll in the magazine 12, cut the element to a predetermined length, place the cut sheet of photosensitive element 2 around the exposure drum 15, expose the element to G, R and IR light-emitting diodes, and apply water to the exposed element by the water applicator 18. The amount of water applied was 10 ml/m$^2$.

The dye-fixing element 3 having the tentative support was delivered from its storage section 30 to the peeler section 55 where the tentative support was peeled away, and then to the bonding section 50. The support 4 was delivered from its storage section 40 to the bonding section 50 where the support 4 is bonded to the dye-fixing element 3 through the self-adhesive layer.

The support having the dye-fixing element 3 bonded thereto and the photosensitive element were fed to the heat-developing/transferring section 20 where they were placed one on another such that the dye-fixing layer of the dye-fixing element was in close contact with the coating of the photosensitive element. The assembly was conveyed through heat rollers at such a temperature that the wet coatings were heated to a temperature of 95° C. for 25 seconds.

The photosensitive element was then separated at the separator section 21 from the dye-fixing element on the support, which bore clear images of yellow, magenta and cyan. The maximum density (Dmax) and minimum density (Dmin) of each color were measured, with the results shown below.

| | Yellow | Magenta | Cyan |
|---|---|---|---|
| Dmax | 2.10 | 2.25 | 2.42 |
| Dmin | 0.18 | 0.16 | 0.14 |

Example 2

A silver benzotriazole emulsion containing photosensitive silver bromide was prepared from liquid A, B and C.

| | | |
|---|---|---|
| (A) | Benzotriazole | 12 g |
| | Isopropyl alcohol | 200 ml |
| (B) | AgNO$_3$ | 17 g |
| | H$_2$O | 50 ml |
| (C) | LiBr | 2.1 g |
| | Ethanol | 20 ml |

With stirring at 40? C., liquid B was added to liquid A. The mixture was a white turbid liquid which indicated that the silver salt of benzotriazole formed. Liquid C was then added to the mixture of A and B. Since silver was available from the silver benzotriazole, part of silver benzotriazole was converted to silver bromide.

The thus formed powder crystals were collected by filtration, added to a polymer solution of 20 grams of polyvinyl butyral in 200 ml of isopropyl alcohol, and dispersed for 30 minutes by means of a homogenizer.

To 10 grams of the silver benzotriazole emulsion containing photosensitive silver bromide was added a solution containing 0.40 grams of a dye-providing substance of the structure shown below and 0.22 grams of guanidine trichloroacetate in 4 ml of ethyl alcohol and 2 ml of N,N-dimethylformamide. The mixture was thoroughly agitated. The coating composition was coated onto a polyethylene terephthalate film of 180 μm thick to a wet thickness of 100 μm and dried to obtain a photosensitive element.

A dye-fixing element having the structure shown in FIG. 2b was prepared by using a polyethylene terephthalate film of 50 μm thick as the polymeric substrate 31, treating the film with a corona discharge, and applying a self-adhesive layer 32 of the same composition as in Example 1 by a bar coating method.

The support used was the same ordinary paper as in Example 1.

The image forming apparatus 1 shown in FIG. 1 was loaded with the above-mentioned photosensitive element, dye-fixing element, and support. It is to be noted that the water applicator 18 was omitted from the apparatus used in this example. The apparatus was operated to take up the photosensitive element 2 from the roll in the magazine 12, cut the element to a predetermined length, place the cut sheet of photosensitive element 2 around the exposure drum 15, and expose the element to a tungsten lamp at 2,000 lux for 10 seconds.

The dye-fixing element 3 having the tentative support was delivered from its storage section 30 to the peeler section 55 where the tentative support was peeled away, and then to the bonding section 50. The support 4 was delivered from its storage section 40 to the bonding section 50 where the support 4 is bonded to the dye-fixing element 3 through the self-adhesive layer.

The support having the dye-fixing element 3 bonded thereto and the photosensitive element were fed to the heat-developing/transferring section 20 where they were placed one on another such that the dye-fixing layer of the dye-fixing element was in close contact with the coating of the photosensitive element. The assembly was conveyed through heat rollers at such a temperature that the coatings were evenly heated to a temperature of 160° C. for 60 seconds.

The photosensitive element was then separated at the separator section 21 from the dye-fixing element on the support, which bore a clear magenta image. The maximum density (Dmax) and minimum density (Dmin) of the image with respect to green light were measured by a Macbeth transmission densitometer TD-504. The results are shown below.

Dmax=1.75
Dmin=0.35

It was found that a clear image was formed on a support of ordinary paper. A subtle change was observed in image quality as compared with a commonly used support, ensuring an esthetic additive value.

The image forming apparatus shown in FIG. 3 was operated with a dye-fixing element of the structure shown in FIG. 2c by following substantially the same procedures as in Examples 1 and 2. The resulting image was as excellent as in the previous examples.

Example 3

The photosensitive element used was the same as used in Example 1.

A dye-fixing element having the structure of FIG. 6a was prepared as shown in Table 3.

TABLE 3

| Formulation of Dye-Fixing Element | |
|---|---|
| Ingredient | Amount (g/m$^2$) |
| Third layer: protective layer | |
| Vinyl alcohol-acrylic acid (75/25 molar ratio) copolymer | 0.25 |
| Surface-active agent A*[1] | 0.02 |
| Surface-active agent B*[2] | 0.1 |
| Second layer: dye-fixing layer | |
| Gelatin | 1.4 |
| Dextran (MW 70,000) | 1.4 |
| Mordant*[3] | 2.8 |
| Oil droplet*[4] | 1.8 |
| Guanidium picolinate | 2.4 |
| First layer | |
| Gelatin | 0.4 |
| Hardener A*[5] | 0.3 |
| Substrate | |
| Polyethylene terephthalate*[6] containing TiO$_2$ white pigment (thickness 25 μm) | |
| **First layer: hot-melt layer*[7]** | |
| EVA (Elvax 150 manufactured by duPont) | 60 pbw |
| Paraffin wax | 40 pbw |

*[1-6] See Example 1
*[7] The hot-melt layer was laminated to a thickness of 20 μm by extrusion coating.

The support used was a sheet of ordinary paper having a thickness of 150 μm.

The image forming apparatus 1 shown in FIG. 4 was loaded with the above-mentioned photosensitive element, dye-fixing element and support. The apparatus was operated to take up the photosensitive element 2 from the roll in the magazine 12, cut the element to a predetermined length, place the cut sheet of photosensitive element 2 around the exposure drum 15, expose the element to G, R and IR light-emitting diodes, and apply water to the exposed element by the water applicator 18. The amount of water applied was 10 ml/m$^2$.

The dye-fixing element 3 and support 4 were delivered from their storage sections 30 and 40 to the heat-bonding section 50 where the support 4 was bonded to the dye-fixing element 3 through the hot-melt layer. A heating temperature of about 140? C. was set in the bonding section 50.

The support having the dye-fixing element 3 bonded thereto and the photosensitive element were fed to the heat-developing/transferring section 20 where they were placed one on another such that the dye-fixing layer of the dye-fixing element was in close contact with the coating of the photosensitive element. The assembly was conveyed through heat rollers at such a temperature that the wet coatings were heated to a temperature of 95° C. for 25 seconds.

The photosensitive element was then separated at the separator section 21 from the dye-fixing element on the support, which bore clear images of yellow, magenta and cyan. The maximum density (Dmax) and minimum density (Dmin) of each color were measured by a Macbeth reflection densitometer (RD-519), with the results shown below.

| | Yellow | Magenta | Cyan |
|---|---|---|---|
| Dmax | 2.08 | 2.15 | 2.33 |

| | Yellow | Magenta | Cyan |
|---|---|---|---|
| Dmin | 0.17 | 0.19 | 0.16 |

Example 4

The photosensitive element used was the same as in Example 2.

A dye-fixing element having the structure shown in FIG. 6b was prepared by using a polyethylene terephthalate film of 50 μm thick as the polymeric substrate 31 and applying a hot-melt composition comprised of an ethylene-vinyl acetate-acrylic acid copolymer (Elvax acid terpolymer 4310 manufactured by duPont) to form a hot-melt layer 37 of 20 μm thick by an extrusion coating method.

The support used was the same as in Example 3.

The image forming apparatus 1 shown in FIG. 4 was loaded with the above-mentioned photosensitive element, dye-fixing element, and support. It is to be noted that the water applicator 18 was omitted from the apparatus used in this example. The apparatus was operated to take up the photosensitive element 2 from the roll in the magazine 12, cut the element to a predetermined length, place the cut sheet of photosensitive element 2 around the exposure drum 15, and expose the element to a tungsten lamp at 2,000 lux for 10 seconds.

The dye-fixing element 3 from its storage section 30 was cut to a predetermined length and delivered to the bonding section 50. The support 4 was delivered from its storage section 40 to the bonding section 50 where the support 4 is bonded to the dye-fixing element 3 through the hot-melt layer.

The support having the dye-fixing element 3 bonded thereto and the photosensitive element were fed to the heat-developing/transferring section 20 where they were placed one on another such that the dye-fixing layer of the dye-fixing element was in close contact with the coating of the photosensitive element. The assembly was conveyed through heat rollers at such a temperature that the coatings were evenly heated to a temperature of 160° C. for 60 seconds.

The photosensitive element was then separated at the separator section 21 from the dye-fixing element on the support, which bore a clear magenta image.

The maximum density (Dmax) and minimum density (Dmin) of the image with respect to green light were measured by a Macbeth transmission densitometer TD-504. The results are shown below.

Dmax=1.71
Dmin=0.28

It was found that a clear image was formed on a support of ordinary paper. A subtle change was observed in image quality as compared with a commonly used support, ensuring an esthetic additive value.

The image forming apparatus shown in FIG. 5 was operated with a dye-fixing element of a different structure by following substantially the same procedures as in Examples 3 and 4. The resulting image was as excellent as in the previous examples.

We claim:

1. An image forming apparatus for fixing an image on a dye-fixing element in accordance with image information in a photosensitive element, comprising
   first storage means for storing a dye-fixing element,
   second storage means for storing a support,
   bond means for bonding a dye-fixing element to a support, and
   feed means for taking the dye-fixing element and the support out of the first and second storage means, respectively, and feeding them to the bond means where the dye-fixing element is bonded to the support.

2. An image forming apparatus for fixing an image on a dye-fixing element in accordance with image information in a photosensitive element, comprising
   first storage means for storing a dye-fixing element having an adhesive layer,
   second storage means for storing a support,
   bond means for bonding the dye-fixing element to the support, and
   feed means for taking the dye-fixing element and the support out of the first and second storage means, respectively, and feeding them to the bond means where the dye-fixing element is bonded to the support through the adhesive layer.

3. The apparatus of claim 2 wherein the adhesive layer is a self-adhesive layer.

4. The apparatus of claim 2 wherein the adhesive layer is a hot-melt layer and the bond means is capable of heat bonding the dye-fixing element to the support through the hot-melt layer.

5. The apparatus of claim 1 which further comprises third storage means for storing the photosensitive element.

6. The apparatus of claim 5 which further comprises contact means for placing the photosensitive element in close contact with the dye-fixing element.

7. The apparatus of claim 2 which further comprises third storage means for storing the photosensitive element.

8. The apparatus of claim 7 which further comprises contact means for placing the photosensitive element in close contact with the dye-fixing element.

9. An image forming apparatus for fixing an image on a dye-fixing element in accordance with image information in a photosensitive element, comprising
   dye-fixing element storage means for storing a dye-fixing element having a self-adhesive layer,
   support storage means for storing a support, and
   bond means for bonding the dye-fixing element to the support,
   whereby the dye-fixing element from the dye-fixing element storage means and the support from the support storage means are bonded through the self-adhesive layer in the bond means.

10. An image forming apparatus for fixing an image on a dye-fixing element in accordance with image information in a photosensitive element, comprising
    dye-fixing element storage means for storing a dye-fixing element having a hot-melt layer,
    support storage means for storing a support, and
    bond means for heat bonding the dye-fixing element to the support,
    whereby the dye-fixing element from the dye-fixing element storage means and the support from the support storage means are heat bonded through the hot-melt layer in the bond means.

* * * * *